April 30, 1940.    M. A. SOROKIN    2,199,054
VALVE CORE AND STEM
Filed Feb. 8, 1939
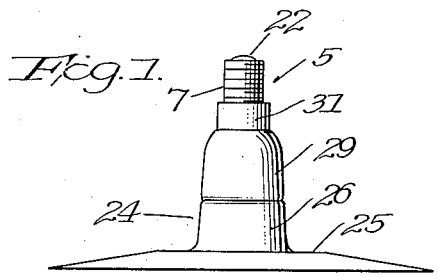
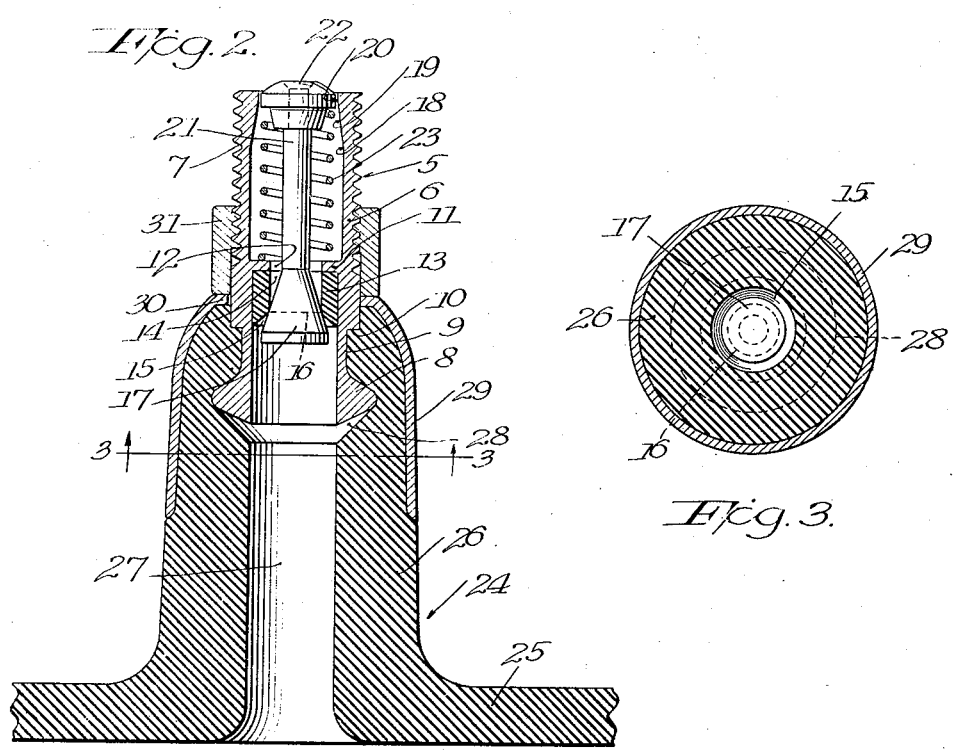
Inventor
Michael A. Sorokin
By Cushman Darby & Cushman
Attorneys Patented Apr. 30, 1940

2,199,054

UNITED STATES PATENT OFFICE 2,199,054

VALVE CORE AND STEM

Michael A. Sorokin, Milford, Conn., assignor to Jenkins Bros., Bridgeport, Conn., a corporation of New Jersey Application February 8, 1939, Serial No. 255,321

6 Claims. (Cl. 277—42)

This invention relates to valve cores and particularly to cores associable with the rubber inflating stems of inflatable bodies such as pneumatic tire tubes. The invention relates also to valve stems. An object of the invention is to provide a core unit of simple and economical construction, improved sealing ability, and, preferably, with a permanently associated closure member rendering unnecessary the use of the customary cap. Another object of the invention is to provide a valve stem wherein a rubber stem body and a core are associated in a simple and effective manner.

In order that the invention may be readily understood, I shall proceed with a description of the practical embodiment shown, by way of example, in the accompanying drawing, in which:

Figure 1 is an elevation of a rubber stem equipped with the new core.

Figure 2 is an axial section greatly enlarged of the stem of Figure 1, and

Figure 3 is a section substantially on line 3—3 of Figure 2.

Referring to the drawing, reference numeral 5 generally designates the new core. The core comprises a tubular member or barrel 6 having an externally threaded portion 7 at one end and an external flange 8 at the other end, the latter being preferably of the rounded triangular section shown in Figure 2 and being surmounted by an annular recess 9 which is bounded on the opposite side by a shoulder 10.

Internally the tubular member 6 is provided intermediate its ends with an annular flange 11, here shown as integral, which defines a circular coaxial opening 12. An annulus 13 of rubber is vulcanized against the lower side of flange 11 and has an internal cylindrical surface 14 registering with opening 12 and a lower conical surface 15, the surfaces 14 and 15 merging in a circular line 16 designed to serve as a valve seat.

Cooperable with the valve seat is a conical valve body 17 whose apex angle is considerably more acute than the angle of the conical surface 15 so that an initial line contact is secured between the seat and the valve body.

Above flange 11 the tubular member is internally substantially cylindrical up to the line 18 and thereabove is conically tapered at 19 to a circular end opening 29.

A pin 21 secured to valve body 17 projects within the threaded portion 7 and has secured to its extremity a head 22 of circular section, which, when body 17 is seated, substantially fills the end opening 20, as clearly shown in Figure 2. A compression spring 23 interposed between flange 11 and head 22 normally seats valve body 17, the later being substantially longer than its possible zone of contact with the seat. Head 22 is unrestrictedly movable in opening 20 so as never to interfere with the full seating of body 17 under the force of spring 23.

A rubber valve stem generally indicated at 24 has a base flap 25 and an integral shaft 26 projecting therefrom, the shaft and flap being traversed by an axial air passage 27 which near its top is provided with a circumferential recess 28. Recess 28 is designed to receive the flange 8 and above the recess the passage is conformed so that its walls follow and closely embrace the portion of the tubular member immediately above flange 8. The upper portion of shaft 26 is relieved so as to substantially flushly receive a rigid jacket 29, which is ordinarily of metal, the jacket conforming to the rounded upper portion of the shaft and terminating in an inwardly directed annular flange 30 which closely surrounds the tubular member. A nut 31 threaded on portion 7 of the tubular member abuts flange 30 so that the rubber of the shaft is compressed between the latter and flange 8, outward bulging of the rubber between these elements being prevented by the jacket 29.

In assembly, a unit 5, including the previously molded seat 11, is inserted in the upper end of the air passage of the stem 24 so as to assume substantially the position shown in Figure 2. In the absence of the jacket, the tip of the stem is distended by the flange 8, so that the latter can readily pass into the recess 28. Jacket 29 is now applied and then the nut 31 is threaded to the position shown.

Due to the clamping action of the nut, a tight seal is secured between the tubular member 5 and the tip portion of the rubber shaft 26. A very effective seal is also obtained between the valve body 17 and its seat. In fact, the line edge contact between the valve body 17 and rubber annulus 13 affords a seal of such efficiency that a secondary seal, such as ordinarily provided by a cap, is unnecessary. Head 22, since it substantially fills the end opening 20 when valve body 17 is seated, prevents ingress of foreign matter and consequent fouling of the valve provisions.

It will be understood that while an initial line contact is obtained between the plug 17 and the seat, the contact area widens into an annular zone or band due to the force of the spring 23 and of the air pressure when the stem is on an inflated tube. Even though the contacting surfaces may be somewhat irregular or inexact it is almost positively certain that in use there will always be at least a line contact throughout the periphery of the plug. With perfectly dimensioned parts there will be a contact zone in the form of a band of uniform width. Under manufacturing tolerances, however, the contact zone may not be of absolutely uniform width and, as above indicated, may attenuate to a mere line.

In any event a circumferentially continuous sealing contact is assured.

It will be seen that the core unit is of extremely simple and efficient construction and is easily applied to a valve stem to provide an effective whole. Variations in the form and arrangement of parts are, of course, possible without departure from the claims which follow. It will be understood that terms such as "upper" and "lower" are used merely as a matter of convenient description, and that by the term "rubber," I mean any suitable similar composition, whether natural or artificial.

I claim:

1. A valve core comprising a tubular member externally threaded at one end to receive a clamping nut and outwardly flanged at its other end for engagement in the air passage of a rubber valve stem, said member having an internal annular flange intermediate its ends, a rubber annulus fixed in said member against the side of said internal flange toward the outwardly flanged end of said member and providing a valve seat, a valve body cooperable with said seat, the threaded end of said member being interiorly tapered to its end opening, a pin secured to said valve body and extending toward said end opening, a head on said pin and substantially filling said end opening when said valve body is seated, and a compression spring between said head and said internal flange and normally seating said valve body.

2. A valve core comprising a tubular member externally threaded at one end to receive a clamping nut and outwardly flanged at its other end for engagement in the air passage of a rubber valve stem, said member having an internal annular flange intermediate its ends, a rubber annulus fixed in said member against the side of said internal flange toward the outwardly flanged end of said member and providing a valve seat, a valve body cooperable with said seat, the threaded end of said member being interiorly tapered to its end opening, a pin secured to said valve body and extending toward said end opening, a head on said pin and substantially filling said end opening when said valve body is seated, and a compression spring between said head and said internal flange and normally seating said valve body, said valve seat being spaced inwardly from the extremity of said flanged end so that said valve body in ordinary operation is always within said member.

3. A valve core comprising a tubular member externally threaded at one end to receive a clamping nut and outwardly flanged at its other end for engagement in the air passage of a rubber valve stem, said member having an internal annular flange intermediate its ends, a rubber annulus fixed in said member against the side of said internal flange toward the outwardly flanged end of said member, said annulus providing a valve seat at the circular line of merging of an inner cylindrical surface and a conical end surface remote from said internal flange, a conical valve body cooperable with said seat, the vertex angle of said valve body being substantially more acute than the vertex angle of said conical end surface and the valve body being substantially longer than its possible zone of contact with said seat, the threaded end of said member being interiorly tapered to its end opening, a pin secured to said valve body and extending toward said end opening, a head on said pin and substantially filling said end opening when said valve body is seated, and a compression spring between said head and said internal flange and normally seating said valve body.

4. A valve core comprising a tubular member externally threaded at one end to receive a clamping nut and outwardly flanged at its other end for engagement in the air passage of a rubber valve stem, said member having an internal annular flange intermediate its ends, a rubber annulus fixed in said member against the side of said internal flange toward the outwardly flanged end of said member, said annulus providing a valve seat at the circular line of merging of an inner cylindrical surface and a conical end surface remote from said internal flange, a conical valve body cooperable with said seat, the vertex angle of said valve body being substantially more acute than the vertex angle of said conical end surface and the valve body being substantially longer than its possible zone of contact with said seat, the threaded end of said member being interiorly tapered to its end opening, a pin secured to said valve body and extending toward said end opening, a head on said pin and substantially filling said end opening when said valve body is seated, and a compression spring between said head and said internal flange and normally seating said valve body, said valve seat being spaced inwardly from the extremity of said flanged end so that said valve body in ordinary operation is always within said member.

5. A valve stem comprising a rubber body having an air passage extending therethrough from base to tip, a valve core comprising a rigid tubular member having one end received in said passage and provided with a radial projection engaged in a recess of the rubber body off said passage, said tubular member having a portion projecting beyond the tip of said body, the tip portion of said tubular member being internally tapered to a reduced end opening, a rubber annulus fixed coaxially within said tubular member above the inner end of the later and constricting the opening therethrough, a movable valve body cooperable with the inner end of said annulus as a seat and disposed within said tubular member when seated, a head on said pin freely slidable in said end opening and disposed in and filling the latter when said valve body is seated, said head moving inwardly of said end opening to permit the passage of air during inflation, a jacket strung on the projecting portion of said tubular member, said jacket overlying the tip end of the rubber body and embracing the rubber body from said tip end to a point at least adjacent said radial projection, and means securing said jacket to said projecting portion so that a portion of the rubber body is clamped between said radial projection and the overlying portion of said jacket, bulging of the rubber body as a result of the clamping action being restrained by the embracing portion of said jacket.

6. A valve stem according to claim 5 wherein the rubber body has a portion below the lower edge of the jacket whose outer surface is substantially flush with the outer surface of the jacket.

MICHAEL A. SOROKIN.